(12) United States Patent
Willner et al.

(10) Patent No.: US 9,736,195 B2
(45) Date of Patent: *Aug. 15, 2017

(54) DYNAMIC BRIDGE FOR OBJECT TRANSFER

(71) Applicant: INTERNATIONAL BUSINESS MACHINES CORPORATION, Armonk, NY (US)

(72) Inventors: Barry E. Willner, Briarcliff Manor, NY (US); Patrick J. O'Sullivan, Dublin (IE); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,400

(22) Filed: Sep. 14, 2015

(65) Prior Publication Data

US 2016/0006770 A1 Jan. 7, 2016

Related U.S. Application Data

(63) Continuation of application No. 12/390,838, filed on Feb. 23, 2009, now Pat. No. 9,143,355.

(51) Int. Cl.
*H04L 29/06* (2006.01)
*H04L 29/08* (2006.01)
*H04L 12/18* (2006.01)
*G06F 3/0486* (2013.01)
*H04L 12/58* (2006.01)

(52) U.S. Cl.
CPC ........ *H04L 65/1069* (2013.01); *G06F 3/0486* (2013.01); *H04L 12/1827* (2013.01); *H04L 12/58* (2013.01); *H04L 65/102* (2013.01); *H04L 67/327* (2013.01)

(58) Field of Classification Search
CPC combination set(s) only.
See application file for complete search history.

(56) References Cited

U.S. PATENT DOCUMENTS

| | | |
|---|---|---|
| 2008/0010609 A1 | 1/2008 | Curtis et al. |
| 2008/0098141 A1* | 4/2008 | Ohno .................. H04L 12/5695 710/106 |
| 2008/0263455 A1 | 10/2008 | Stults et al. |
| 2009/0228899 A1 | 9/2009 | Marcos et al. |

* cited by examiner

*Primary Examiner* — Abdullahi E Salad
(74) *Attorney, Agent, or Firm* — Charles L. Moore; Moore & Van Allen PLLC

(57) ABSTRACT

A request for a first dynamic bridge end is received at a first device. A capability for a second dynamic bridge end is transmitted to a second device. At least one of the first dynamic bridge end and the second dynamic bridge end have a movable end point location. The first dynamic bridge end and the second dynamic bridge end create a path for transmission of an object.

20 Claims, 9 Drawing Sheets

DYNAMIC BRIDGE FOR OBJECT TRANSFER

BACKGROUND OF THE INVENTION

This disclosure relates to collaborative sharing, and more particularly to the transfer of objects between locations.

An important aspect of collaboration is sharing. For example, collaboration could include the sharing of emails or files through sending the object from one person to another, or through placing the objects shared folders, which the collaborating parties may be able to access. Many types of objects can be shared by attaching to, or embedding in an email. Similarly, people may place documents for sharing into teamrooms, or other collaborative spaces.

In current paradigms an object starts out in an object repository (or a defacto repository associated with composition software, such as an email residing within a folder of an email client). The object may then be placed in, copied to, emailed to, or file transferred to another repository. This transfer could be synchronous or asynchronous. The object may originate from and be sent to either a private or shared repository.

This object transfer while often simple is labor intensive on both the sender and receiver if many objects are to be sent. Further there are difficulties if the sending and receiving repositories are different. A sender may wish to send an email. The recipient may wish to store the email in the operating system file system, and not within an email paradigm. Therefore, transcoding for object repository or other compatibility may be required.

BRIEF SUMMARY OF THE INVENTION

In a first implementation, a method includes receiving a request for a first dynamic bridge end at a first device. A capability for a second dynamic bridge end is transmitted to a second device. At least one of the first dynamic bridge end and the second dynamic bridge end have a movable end point location. The first dynamic bridge end and the second dynamic bridge end create a path for transmission of an object.

In another implementation, a computer program product includes a computer readable storage medium having computer readable program code embodied therewith. The computer readable program code includes computer readable program code configured to receive a request for a first dynamic bridge end at a first device. The computer readable program code also includes computer readable program code configured to transmit a capability for a second dynamic bridge end to a second device. At least one of the first dynamic bridge end and the second dynamic bridge end have a movable end point location. The first dynamic bridge end and the second dynamic bridge end create a path for transmission of an object.

In yet another implementation, a computing system includes a processor and a memory module coupled with the processor. A first software module is executable by the processor and the memory module. The first software module is configured to receive a request for a first dynamic bridge end at a first device. A second software module is executable by the processor and the memory module. The second software module is configured to transmit a capability for a second dynamic bridge end to a second device. At least one of the first dynamic bridge end and the second dynamic bridge end has a movable end point location. The first dynamic bridge end and the second dynamic bridge end create a path for transmission of an object.

The details of one or more implementations are set forth in the accompanying drawings and the description below. Other features and advantages will become apparent from the description, the drawings, and the claims.

DETAILED DESCRIPTION OF THE INVENTION

Figure 1:
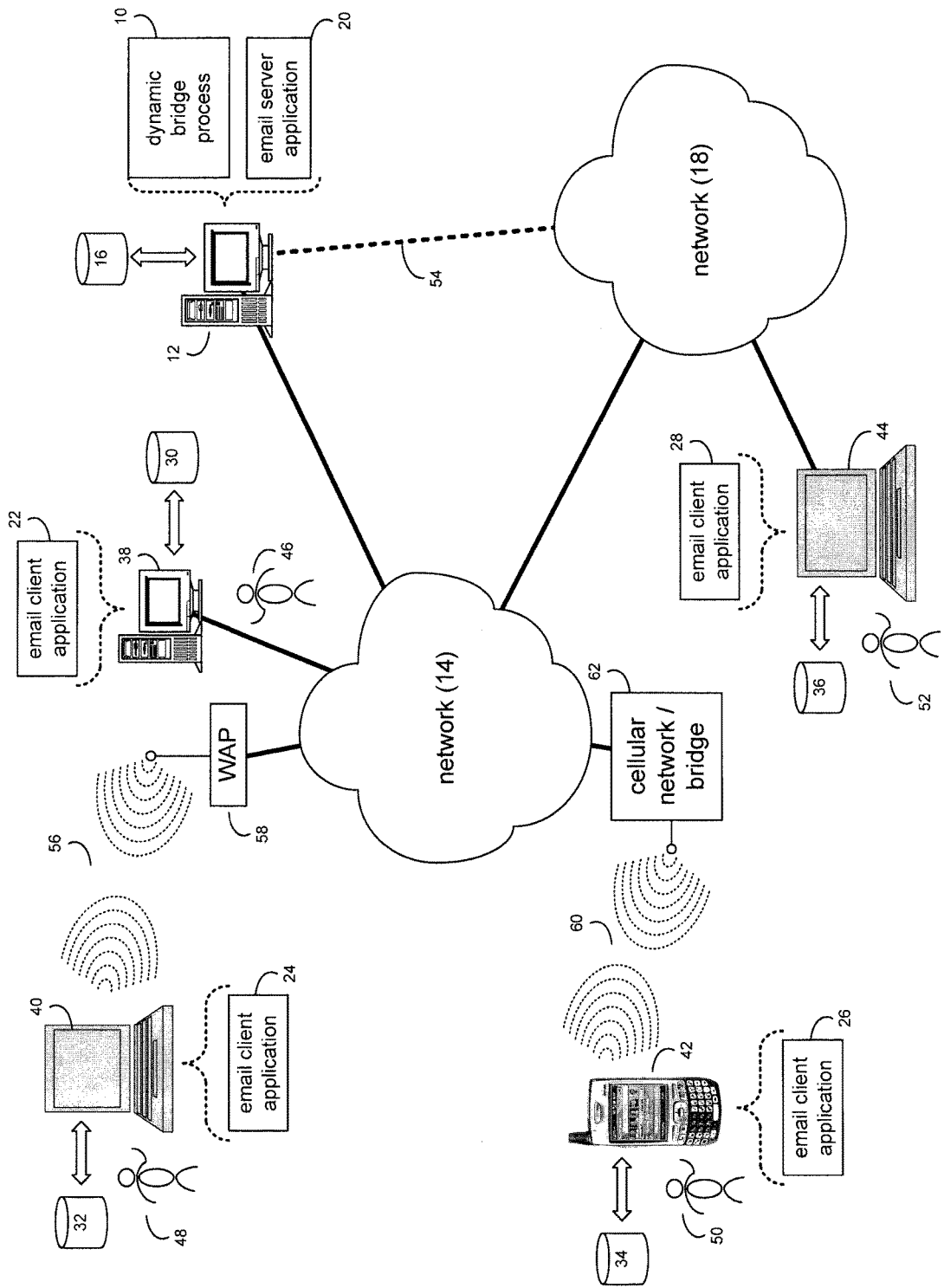
FIG. 1 is a diagrammatic view of a dynamic bridge process and an email system coupled to a distributed computing network.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown dynamic bridge process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® NetWare®; or Red Hat® Linux®, for example (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both), for example. Alternatively, the dynamic bridge process may reside on and be executed, in whole or in part, by a client electronic device, such as a personal computer, notebook computer, personal digital assistant, or the like.

As will be discussed below in greater detail, dynamic bridge process 10 may receive a request for a first dynamic bridge end at a first device. Dynamic bridge process may also transmit a capability for a second dynamic bridge end to a second device. At least one of the first dynamic bridge end and the second dynamic bridge end may have a movable end point location. The first dynamic bridge end and the second dynamic bridge end may create a path for transmission of an object. The object may be stored on a computer readable medium (e.g., a hard disk drive; a solid state drive, a tape drive; an optical drive; a RAID array; a random access memory (RAM); and a read-only memory (ROM))

The instruction sets and subroutines of dynamic bridge process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute email server application 20, examples of which may include but are not limited to, e.g., IBM® Lotus® Domino® Server and Microsoft Exchange® Server (IBM, Lotus, and Domino are registered trademarks of International Business Machines Corporation in the United States, other countries or both; Exchange is a registered trademark of Microsoft Corporation in the United States, other countries or both). Email server application 20 may be a mail transfer agent that may allow for the exchange of email communications via email client applications, e.g., email client applications 22, 24, 26, 28, examples of which may include but are not limited to Lotus Notes® and Microsoft Outlook® (Lotus Notes is a registered trademark of International Business machines Corporation in the United States, other countries, or both; and Outlook is a registered trademark of Microsoft Corporation in the United States, other countries, or both). Dynamic bridge process 10 may be a stand alone application. As a stand alone application dynamic bridge process 10 may interface with a communication network (e.g., an email system by interfacing with email server application 20). Additionally/alternatively, dynamic bridge process 10 may be an applet/application/scrip that may interact with and/or be executed within the environment of a communication application (e.g., maybe executed within email server application 20).

The instruction sets and subroutines of email server application 20, which may be stored on storage device 16 coupled to server computer 12 may be executed by one or more processors (not shown) and one or more memory modules (not shown) incorporated into server computer 12.

In addition/as an alternative to being a server-based application residing on server computer 12, the dynamic bridge process may be a client-side application residing on a storage device (e.g., stored on storage devices 30, 32, 34, 36) coupled to one or more client electronic devices (e.g., client electronic devices 38, 40, 42, 44, respectively). Similarly, the dynamic bridge process may include more than one client-side application, e.g., each of which may reside on a storage device (e.g., be stored on storage devices 30, 32, 34, and/or 36) coupled to one or more respective client electronic devices (e.g., client electronic devices 38, 40, 42, and/or 44, respectively). As one or more client side application, the dynamic bridge process may be a stand alone application. As one or more stand alone application(s) the dynamic bridge process may interface with a communication network (e.g., an email system by interfacing with an email client application). Additionally/alternatively, the one or more client-side dynamic bridge process may be an applet/application/scrip that may interact with and/or be executed within the environment of a communication application (e.g., may be executed within an email client application). Accordingly, dynamic bridge process may be a server-side process, a client-side process, multiple client-side processes (e.g., which may interact with one another and/or one or more server side processes), and/or may be a hybrid client-side/server-side process, which may be executed, in whole or in part, by a client electronic device, by a server computer, and/or jointly by a client electronic device and a server computer.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may allow users to e.g., create email, send email, receive email, and the like.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11 a, 802.11 b, 802.11 g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11 x specifications may use Ethernet protocol and carrier sense multiple access with collision avoidance (i.e., CSMA/CA) for path sharing. The various 802.11 x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CEO, Red Hat Linux, or a custom operating system (Windows CE is a registered trademark of Microsoft Corporation in the United States, other countries, or both).

Figure 2:
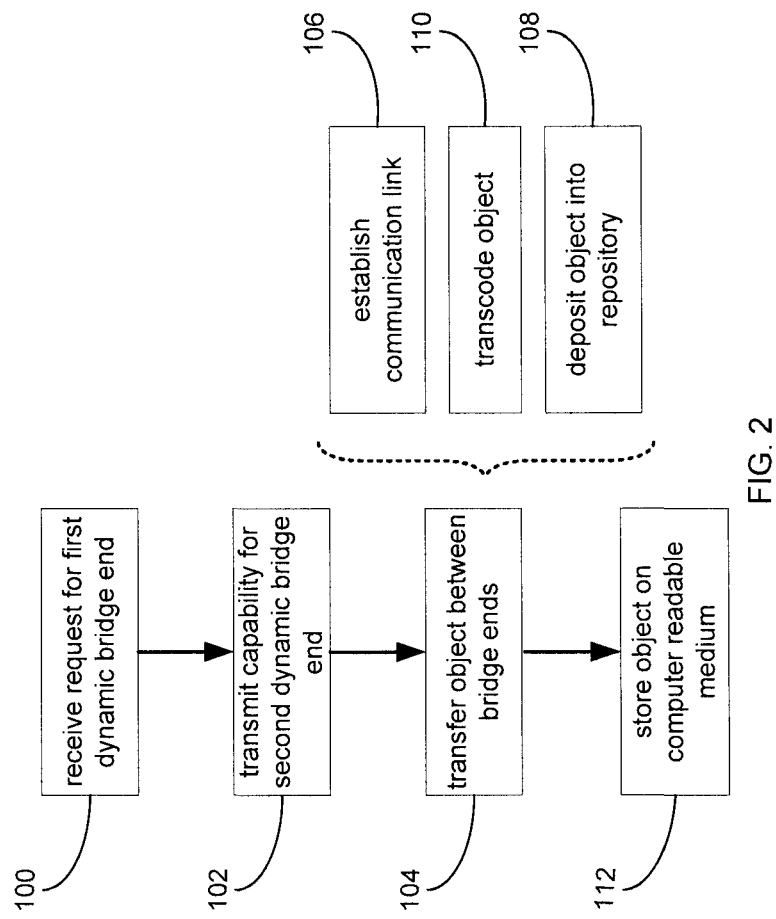
FIG. 2 is a flowchart of the dynamic bridge process of FIG. 1.

Referring to FIG. 2, dynamic bridge process 10 may generally provide a method that may allow users to share objects with one another. As used herein, objects may include, but are not limited to, electronic files, email messages, folders, software (e.g., applications, executable code, scripts and the like) or any other data object (e.g., that may reside on and/or be stored by a computing device or storage device and/or transferred electronically). As will be discussed in greater detail below, the method may generally include receiving a request for a first dynamic bridge end (at process block 100) at a first device. The method may further include transmitting a capability for a second dynamic bridge end (at process block 102) to a second device. At least one of the first dynamic bridge end and the second dynamic bridge end may have a movable end point location. The first dynamic bridge end and the second dynamic bridge end may create a path for transmission of an object.

As stated above, at process block 100, the method may include receiving a request for a first dynamic bridge end at a first device, and at process block 102 the method may include transmitting a capability for a second dynamic bridge end to a second device. Transmitting a capability for the second dynamic bridge end to the second device may include transmitting the information necessary to create the second dynamic bridge end at the second device. The first device may be a server computer and/or the first device may be a client device. Similarly, the second device may be a server computer and/or the second device may be a client device. The first dynamic bridge end and the second dynamic bridge end may include a reference to one another. The reference may include a respective (or a shared) identifier, location information, or the like that may be associated with the first dynamic bridge end and/or the second dynamic bridge end. The reference may be associated with each respective dynamic bridge end. Additionally/alternatively, the reference may be stored on a server.

The first dynamic bridge end and the second dynamic bridge end may each be, for example, an application, applet, script, shortcut, or the like. As such, while including a reference to one another, the first dynamic bridge end and the second dynamic bridge end may each be a distinct entity. Further, at least one of the first dynamic bridge end and the second dynamic bridge end may have a movable end point location. The end point location of each of the first dynamic bridge end and the second dynamic bridge end may be the respective location (e.g., on a desktop of a client device, within a mailbox or folder of an email repository, within a file system, document repository, or the like) of the first dynamic bridge end and the second dynamic bridge end. Further, the end point location of the first dynamic bridge end and the end point location of the second dynamic bridge end may define origination and destination locations for object being transferred (at process block 104) via the dynamic bridge including the first dynamic bridge end and the second dynamic bridge end (e.g., via the path for transmission of an object created by the first dynamic bridge end and the second dynamic bridge end).

The end point location of at least one of the first dynamic bridge end and the second dynamic bridge end may be movable, e.g., by drag-and-dropping (e.g., using an onscreen pointing device) the dynamic bridge end from one location to another (e.g., from one location within a file system to another location within the file system, etc.), by cut-and-pasting the dynamic bridge end from one location to another (e.g., from a desktop of a client device to an email folder within an email system). Similarly, the end point location of the first dynamic bridge end and/or the second dynamic bridge end may be movable via replication. For example, the first dynamic bridge end and/or the second dynamic bridge end may be copied. The end point location of the original dynamic bridge end may have a first location (e.g., within a file system or the like) and the copy of the dynamic bridge end may be placed in a second location (e.g., by moving, or pasting, the copy of the dynamic bridge end in the second location, by sending the copy of the dynamic bridge end to another user/client electronic device, or the like).

Receiving the request for the first dynamic bridge end and transmitting the capability for the second dynamic bridge end (at process blocks 100 and 102 respectively) may include defining one or more attributes of a dynamic bridge including the first dynamic bridge end and the second dynamic bridge end. Attributes of the dynamic bridge including the first dynamic bridge end and the second dynamic bridge end may be based upon, at least in part, user input, system settings, defined rules, or the like. Attributes of the dynamic bridge may include, for example, object transfer directionality (e.g., objects may only be transferred from the first dynamic bridge end to the second dynamic bridge end, or vice-versa, or objects may be bi-directionally transferred to and from each of the first dynamic bridge end and the second dynamic bridge end, etc.), replication permissions for the first dynamic bridge end and the second dynamic bridge end (e.g., permission to copy either of the dynamic bridge ends), and the like. The number and nature of the attributes that may be defined for the first dynamic bridge end and/or the second dynamic bridge end may vary according to design preference and user need.

In addition to having movable end point locations, the first dynamic bridge end may be capable of being associated with a first client device, and the second dynamic bridge end may be capable of being associated with a second client device. Associating the first dynamic bridge end with the first client device and associating the second dynamic bridge end with the second client device, may allow objects to be transferred between the first client device and the second client device via a dynamic bridge including the first dynamic bridge end and the second dynamic bridge end. According to an embodiment, receiving the request for the first dynamic bridge end (at process block 100) may result in generating the first dynamic bridge end on the first client electronic device and/or sending the first dynamic bridge end to the first client electronic device (e.g., from a server computer), thereby associating the first dynamic bridge end with the first client electronic device. Similarly, transmitting the capability for the second dynamic bridge end (at process block 102) may include transmitting (e.g., from a server computer and/or from the first client electronic device) the second dynamic bridge end (and/or information necessary to create the second dynamic bridge end) to the second client electronic device, thereby associating the second dynamic bridge end with the second client electronic device. Additionally/alternatively, transmitting the capability for the second dynamic bridge end (at process block 102) to a second device may result in generating the second dynamic bridge end on the second client electronic device In an embodiment in which the first dynamic bridge end may have a movable end point location, once the first dynamic bridge end has been associated with the first client electronic device, the first dynamic bridge end may be moved to a desired location (e.g., by drag-and-dropping, cut-and-pasting, etc., the first dynamic bridge end to the desired location). Similarly, once the second dynamic bridge end has been associated with the second client electronic device, the second dynamic bridge end may be moved to a desired location (e.g., by drag-and-dropping, cut-and-pasting, etc., the second dynamic bridge end to the desired location). As discussed above, moving the first dynamic bridge end to a desired location and/or moving the second dynamic bridge end to a desired location may specify desired origination and destination points for objects transferred via the dynamic bridge including the first dynamic bridge end and the second dynamic bridge end.

The first dynamic bridge end and the second dynamic bridge end may create a path for transmission of an object. As such, an object may be transferred between the first dynamic bridge end and the second dynamic bridge end, at process block 104, via the path for transmission of the object. The path for transmission of the object may include a communication link. The communication link may include any communication network and scheme. For example the communication link may utilize an email system. In such an embodiment, the object may be transferred between the first dynamic bridge end and the second dynamic bridge end using simple mail transfer protocol (SMTP), or other email protocol utilized by the email system. In addition/as an alternative to utilizing an email communication network for transferring the object between the first dynamic bridge end and the second dynamic bridge end, other communication networks and protocols (e.g., a messaging oriented middleware such as WebSphere MQ running over TCP/IP, an Enterprise Service Bus such as WebSphere ESB available from IBM Web Services using SOAP (simple object access Protocol) over HTTP file transfer) may similarly be utilized. WebSphere is a registered trademark of International Business Machines Inc. in the United States, other countries, or both.

Various communication network adapters may be utilized by the first dynamic bridge end and the second dynamic bridge end for transferring objects over a given communication network. The adapters may interface with the communication network and/or an application that interfaced with the communication network for the purposed of transferring objects. The type of communication network utilized by the first dynamic bridge end and the second dynamic bridge end may be established when the request for the first dynamic bridge end is received, and when the capability for the second dynamic bridge end is transmitted, at process blocks 100 and 102, respectively (e.g., by the inclusion of an adapter for transferring objects over a specific communication network). Additionally/alternatively, the first dynamic bridge end and the second dynamic bridge end may each include a plurality of adapters allowing objects to be transferred over various communication networks. In such an example, the communication network utilized for transferring an object between the first dynamic bridge end and the second dynamic bridge end, at process block 104, may be selected at the time of transfer. The communication network may be selected based upon, for example, available communication networks at the time of transfer, quality of service of available communication networks, the size of the object to be transferred, and the like.

Transferring an object between the first dynamic bridge end and the second dynamic bridge end may include transferring the object in response to the object being dragged onto an icon representing one of the first dynamic bridge end and the second dynamic bridge end. The first dynamic bridge end and/or the second dynamic bridge end may be represented by a graphical feature (e.g., an icon) within a user interface, e.g., of a client electronic device associated with the dynamic bridge end. In order to transfer an object between the first dynamic bridge end and the second dynamic bridge end, a user may drag the object (e.g., a graphical feature representing the object within the graphical user interface) onto the icon representing the first dynamic bridge end or the second dynamic bridge end. In response to the object (e.g., a graphical feature representing the object) being dragged onto the icon representing one of the first dynamic bridge end and the second dynamic bridge end, the method may include transferring the object to the other of the first dynamic bridge end and the second dynamic bridge end, at process block 104.

Depending upon user preference and system configuration, dragging the object onto the icon representing one of the first dynamic bridge end and the second dynamic bridge end may result in a copy-transfer or a cut-transfer of the object to the other of the first dynamic bridge end and the second dynamic bridge end. In the case of a copy-transfer of the object, the object may be copied, and the copy of the object may be transferred to the other dynamic bridge end. The original object (or a copy of the object) may be retained, e.g., on the client electronic device of the originating dynamic bridge end (i.e., client electronic device associated with the dynamic bridge end from which the object is being transferred). In the case of a cut-transfer, the object (or a copy of the object) may be transferred to the other dynamic bridge end (e.g., the receiving or destination dynamic bridge end). The object may be deleted from the client electronic device associated with the originating dynamic bridge end. As such, a copy of the object may not be retained on the client electronic device associated with the originating dynamic bridge end.

Transferring the object between the first dynamic bridge end and the second dynamic bridge end, at process block 104, may include establishing a communication link between the first dynamic bridge end and the second dynamic bridge end, at process block 106. As discussed above, the first dynamic bridge end and the second dynamic bridge end may each include an application, an applet, a script, a shortcut or the like. Accordingly, the first dynamic bridge end and the second dynamic bridge end may establish a communication link directly (at process block 106) between one another (e.g., using any appropriate communication network). Additionally/alternatively, the first dynamic bridge end and the second dynamic bridge end may interface with an application associated with a communication network (e.g., an email application, a web browser, an instant messaging application, message-oriented middleware, enterprise service bus, or the like). Accordingly, establishing a communication link between the first dynamic bridge end and the second dynamic bridge end may include establishing a communication link directly between the first dynamic bridge end and the second dynamic bridge end and/or establishing a communication link between the first dynamic bridge end and the second dynamic bridge end via an application associated with a communication network.

Additionally, establishing a communication link between the first dynamic bridge end and the second dynamic bridge end, at process block 106, may include ascertaining a location of the first dynamic bridge end and/or the second dynamic bridge end. For example, as discussed above, the first dynamic bridge end and the second dynamic bridge end may be movable (e.g., may have a movable end point location). As such, establishing the communication link between the first dynamic bridge end and the second dynamic bridge end, at process block 106, may include ascertaining a location of the first dynamic bridge end and the second dynamic bridge end in order to establish the communication link therebetween.

According to an embodiment, ascertaining the location of the first dynamic bridge end and/or the second dynamic bridge end may occur whenever one of the dynamic bridge ends is moved. For example, whenever one of the first dynamic bridge end and/or the second dynamic bridge end are moved (e.g., as discussed above), the dynamic bridge end that was moved may report its new location. Reporting the new location of the first dynamic bridge end or the second dynamic bridge end may utilize a peer to peer scheme, in which the moved dynamic bridge end may report its new location directly to the other dynamic bridge end (e.g., based upon known location information included in the reference between the two dynamic bridge ends created when the first dynamic bridge end and the second dynamic bridge end were initially generated).

Additionally/alternatively, reporting the new location of the first dynamic bridge end and/or the second dynamic bridge end may utilize a centralized reporting scheme. For example, each of the first dynamic bridge end and the second dynamic bridge end may report its respective location to a dynamic bridge server (e.g., which may manage the dynamic bridge including the first dynamic bridge end and the second dynamic bridge end). The dynamic bridge server may store the location of each of the first dynamic bridge end and the second dynamic bridge end. In the event that that the first dynamic bridge end and/or the second dynamic bridge end is moved, the moved dynamic bridge end may report its new location to the dynamic bridge server. The dynamic bridge server may store the new location of the moved dynamic bridge end. Additionally, the dynamic bridge server may transmit the new location of the moved dynamic bridge end to the other dynamic bridge end. In such an embodiment, the first dynamic bridge end and the second dynamic bridge end may be updated as to the location of the other dynamic bridge end (e.g., in the event that one of the first dynamic bridge end and the second dynamic bridge end is moved). Accordingly, even in the event that one of the first dynamic bridge end and the second dynamic bridge end has been moved, a communication link may be established between the first dynamic bridge end and the second dynamic bridge end, at process block 106.

In addition/as an alternative to establishing a direct communication link between the first dynamic bridge end and the second dynamic bridge end, establishing the communication link between the first dynamic bridge end and the second dynamic bridge end (at process block 106) may include establishing a communication link via a dynamic bridge server. Continuing with the above-stated example, in which an object may be transferred by dragging the object onto an icon representing, e.g., the first dynamic bridge end, the object may be transferred via a communication link (e.g., as discussed above) to a dynamic bridge server. The dynamic bridge server may then transfer the object via a communication link to the second dynamic bridge end. Additionally, if the second dynamic bridge end is not active (e.g., the client electronic device is not currently connected to the communication network supporting the communication link), the dynamic bridge server may store the object and transfer it once the second dynamic bridge end is once again active. Transferring the object to the second dynamic bridge end may be based upon a location of the second dynamic bridge end stored by, and/or accessible by, the dynamic bridge server. In such an example, the object may be transferred from the first dynamic bridge end to the second dynamic bridge end, and may not require that the first dynamic bridge end maintain location information relative to the second dynamic bridge end. As such, it may only be necessary for the dynamic bridge server to store, and/or access, the location of each of the first dynamic bridge end and the second dynamic bridge end.

Transferring the object between the first dynamic bridge end and the second dynamic bridge end, at process block 104, may include depositing the object into a repository, at process block 108. A repository may include, for example, a folder within a file system, an electronic mailbox, a database, or the like. As discussed above, the first dynamic bridge end and the second dynamic bridge end may each have a movable end point location, e.g., which may be moved by dragging-and-dropping, etc., an icon representing the dynamic bridge end within a graphical user interface of a client electronic device. The end point location of the first dynamic bridge end and/or the second dynamic bridge end may be moved to a desired repository. When an object is transferred to the first dynamic bridge end or the second dynamic bridge end, the object may be deposited into the repository (at process block 108) including the respective dynamic bridge end.

The method herein may, at least in part, allow two (or more) homogenous or heterogeneous environments to be connected. As such, transferring the object between the first dynamic bridge end and the second dynamic bridge end, at process block 104, may include transcoding the object from a first object type to a second object type, at process block 110. Continuing with the above-description, in which transferring the object, in process block 104, may include depositing the object into a repository, in process block 108, transferring the object may also include transcoding the object (at process block 110), e.g., from an initial format into a format corresponding to the repository. Additionally/alternatively user preferences and/or system rules may be implemented for determining a transcoding format of the object. For example, an object in the form of a Microsoft Word document may be transferred from the first dynamic bridge end, associated with a first client electronic device, to the second dynamic bridge end, associated with a second client electronic device. The second dynamic bridge end may be located within an electronic mailbox. In such an example, transferring the object may include transcoding the Microsoft Word document into an email format and/or inserting the Microsoft Word document as an attachment to an email.

Transcoding the object from a first object type to a second object type may be achieved through the use of adapters, e.g., which may be selected based upon individual destination repository API's. In an embodiment in which transferring the object (at process block 104) includes establishing a communication link (at process block 106) via a dynamic bridge server, the dynamic bridge server may transcode the object (at process block 110), e.g., based upon an end point location of the receiving (e.g., destination) dynamic bridge end, which may be stored by the dynamic bridge server. In other embodiments, the object may be transcoded by the receiving dynamic bridge end. The first dynamic bridge end and/or the second dynamic bridge end may include adapters necessary for transcoding objects corresponding to a user preference and/or a end point location repository type. Adapters for transcoding may be included with the dynamic bridge ends when the first dynamic bridge end and the second dynamic bridge end are generated (e.g., in response to receiving a request for the first dynamic bridge end in process block 100, and in response to transmitting the capability for the second dynamic bridge end in process block 102). Additionally/alternatively, adapters for transcoding may be retrieved by/pushed to the first dynamic bridge end and/or the second dynamic bridge end whenever a bridge end is moved to a new end point location and/or whenever need/requested.

Additionally, the method may include storing the object on a computer readable medium (at process block 112). The computer readable medium may include, but is not limited to, a hard disk drive; a solid state drive, a tape drive; an optical drive; a RAID array; a random access memory (RAM); and a read-only memory (ROM), for example. The object may be stored (at process block 112) in the original format and/or in the transcoded format.

For the following discussion of exemplary implementations, dynamic bridge process 10 is going to be described as a server-side process that may interface with an email system (e.g., including email server application 20 and one or more email client applications 22, 24, 26, 28) for generating one or more dynamic bridge ends and for transferring object therebetween. However, as discussed above, this exemplary implementation is only one of several possible implementations, and should not be construed as a limitation of the present disclosure.

Figure 3:
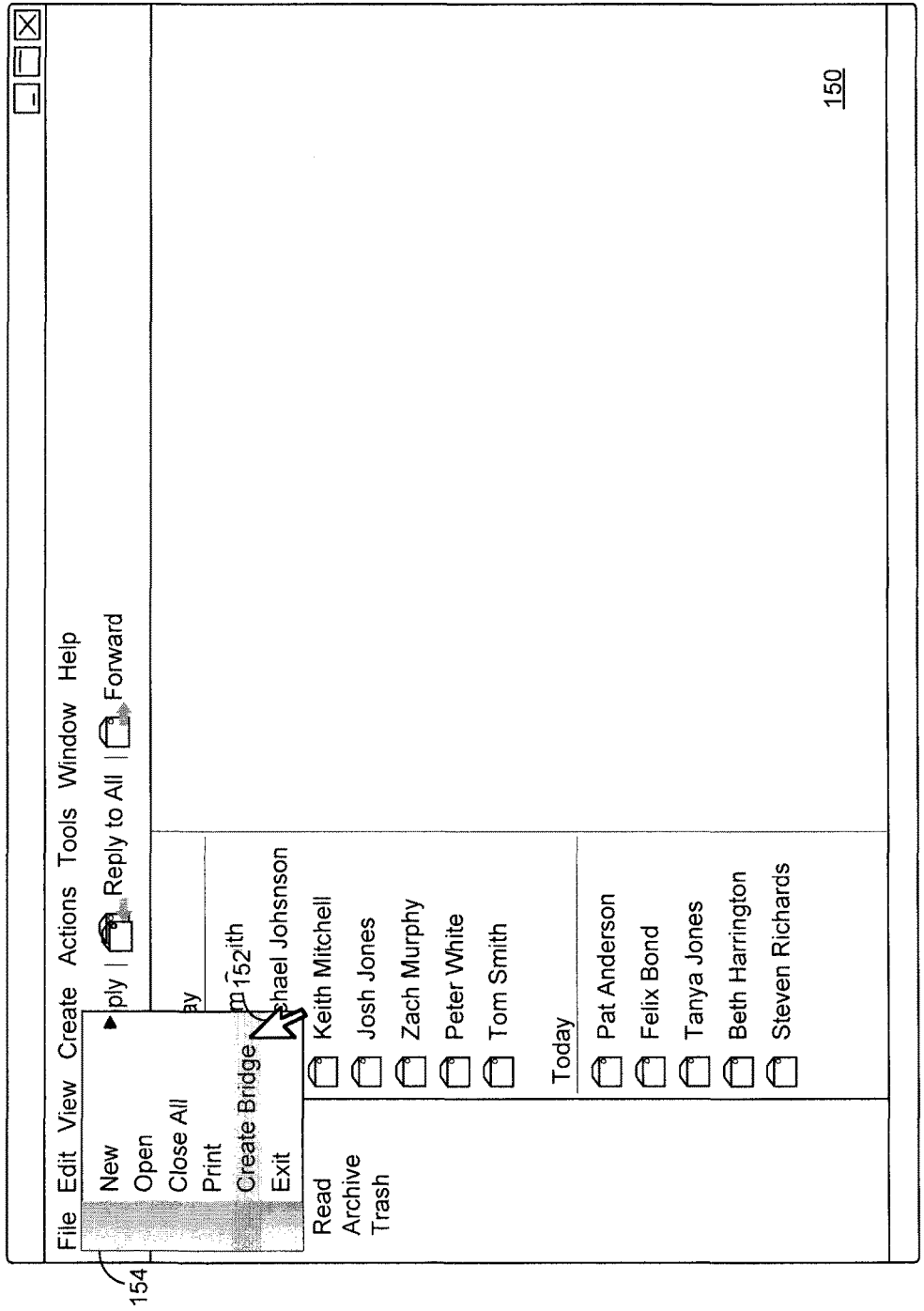
FIG. 3 is a diagrammatic view of a display screen rendered by an email client application and/or the dynamic bridge process of FIG. 1.

Referring also to FIG. 3, email client application 22 may render email user interface 150. Through email user interface 150 user 46 may create a dynamic bridge. For example, user 46 may select, via onscreen pointer 152 (which may be controlled by a pointing device such as a mouse, not shown), "File" from the option menu of email user interface 150. Selecting "File" from the option menu of email user interface 150 may result in email client application 22 (alone or in conjunction with dynamic bridge process 10 and/or email server application 20) rendering pull-down menu 154. Pull-down menu 154 may include various options, including the option "Create Bridge."

Figure 4:
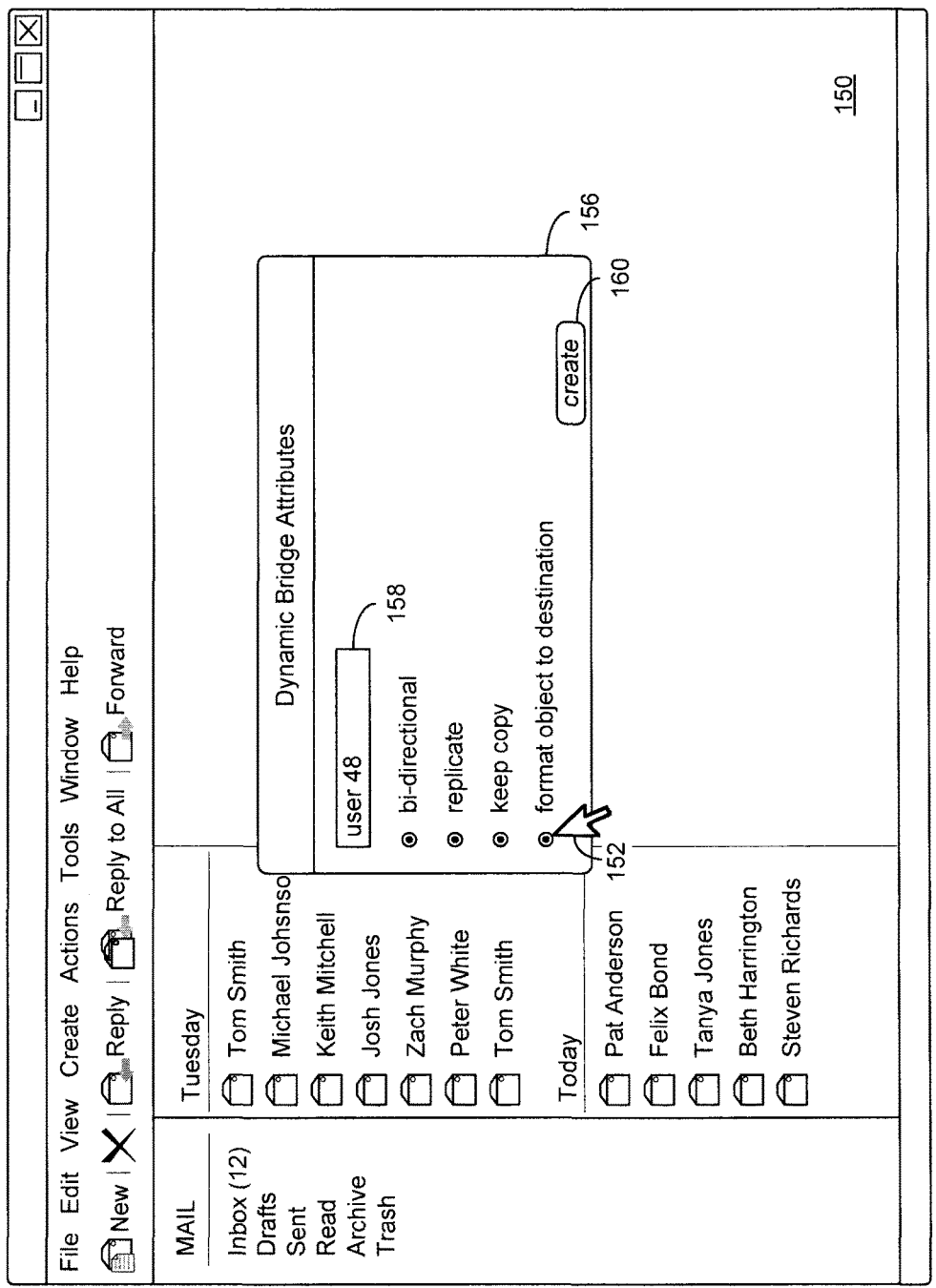
FIG. 4 is a diagrammatic view of a display screen rendered by the email client application and/or the dynamic bridge process of FIG. 1.

Referring also to FIG. 4, selecting, via onscreen pointer 152, "Create Bridge" option from pull-down menu 154 may result in dynamic bridge process 10 (alone or in conjunction with one or more of email client application 22 and email server application 20) rendering attribute menu 156. While attribute menu 156 is shown including four options (namely "bi-directional", "replicate", "keep copy", and "format object to destination"), this is for illustrative purposes only, and should not be construed as a limitation of the present disclosure, as the number and nature of options included within attribute menu 156 may vary according to user need and design preference.

User 46 may enter the identity of the other party (e.g., user 48) to the dynamic bridge, e.g., by inputting user 48's email address in recipient block 158. Additionally, using onscreen pointer 152, user 46 may establish the desired attributes for the dynamic bridge, which will be described in greater detail below. For example, user 46 may select, via onscreen pointer 152, "bi-directional" to provide for a dynamic bridge that may allow for the bi-directional transfer of objects. Similarly, user 46 may select "replicate" to allow the dynamic bridge ends to be replicated. User 46 may also select "keep copy" to allow a copy of the object to be retained by the originator. Further, user 46 may select "format object to destination" to allow objects transferred via the dynamic bridge to be formatted according to the destination location.

Once user 46 has selected the desired dynamic bridge attributes from attribute menu 156, user 46 may select, via onscreen pointer 152, create button 160. Selecting create button 160 may result in dynamic bridge process 10 (alone or in conjunction with one or more of email client application 22, email client application 24, and/or email server application 20) receiving a request for a first dynamic bridge end at the first device (e.g., at client electronic device 38) and transmitting a capability for a second dynamic bridge end at a second device (e.g., at client electronic device 40 associated with user 48). The first dynamic bridge end and the second dynamic bridge end may create a path for transmission of an object (e.g., between the dynamic bridge end and the second dynamic bridge end).

Figure 5:
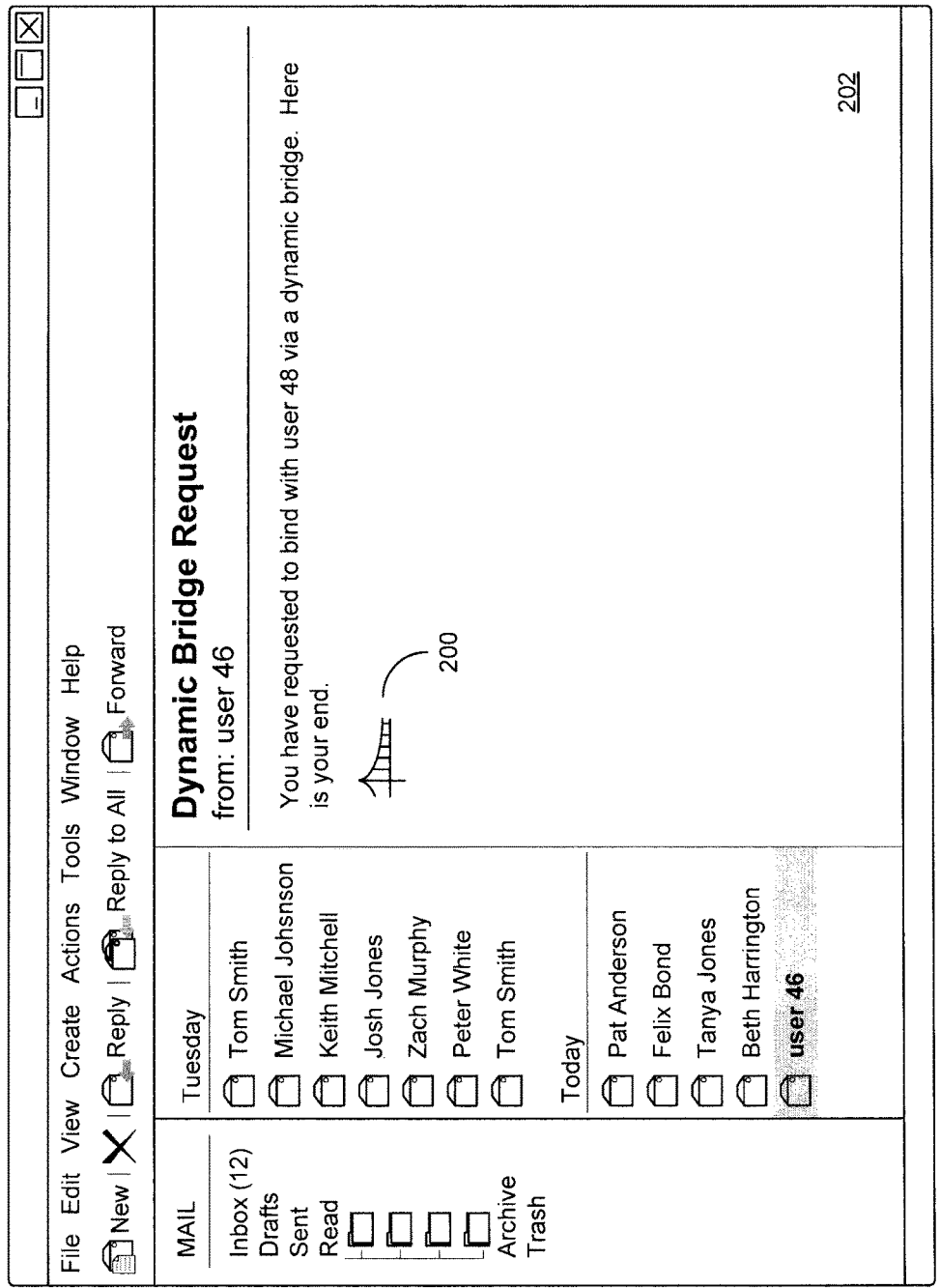
FIG. 5 is a diagrammatic view of a display screen rendered by the email client application and/or the dynamic bridge process of FIG. 1.
Figure 6:
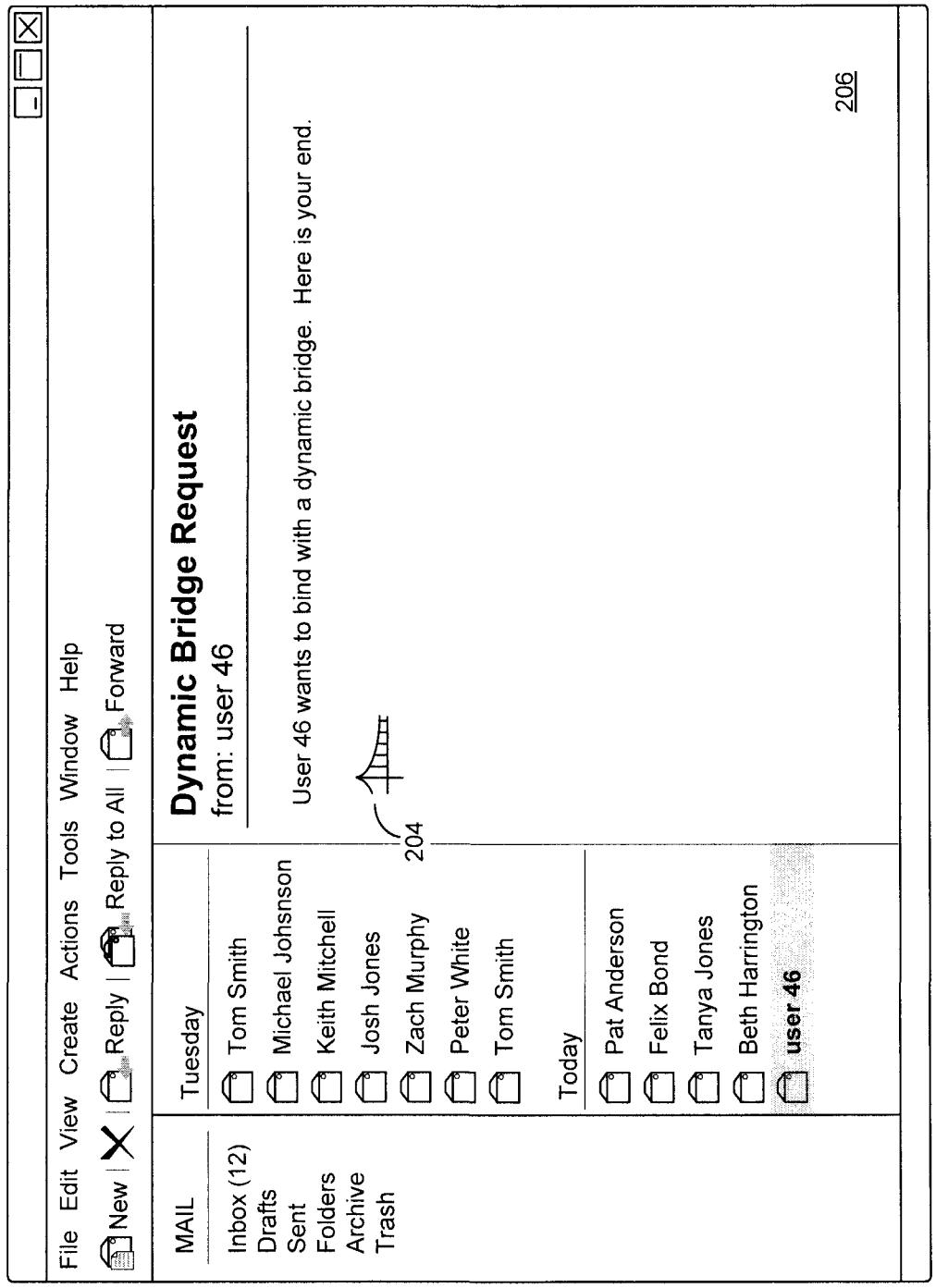
FIG. 6 is a diagrammatic view of a display screen rendered by the email client application and/or the dynamic bridge process of FIG. 1.

Continuing with the above-stated example, and referring also to FIG. 5, dynamic bridge process 10 may, in response to receiving a request for the first dynamic bridge end at the first device, generate a first dynamic bridge end, e.g., which may be received by user 46 via email client application 22. For example, the first dynamic bridge end (e.g., which may be represented by icon 200) may be received as an embedded feature of, or attachment to, dynamic bridge request notice 202. Similarly, and referring also to FIG. 6, dynamic bridge process 10 may transmit a capability for a second dynamic bridge end, e.g., which may be received by user 48 via email client application 24 at client electronic device 40. Transmitting the capability for the second dynamic bridge end may include transmitting the information necessary to establish and/or generate the second dynamic bridge end at the second device. For example, the second dynamic bridge end (e.g., which may be represented by icon 204) may be received as an embedded feature of, or attachment to, dynamic bridge request notice 206. While the first device has hereinabove been described as a client electronic device, the first device may additionally/alternatively be a server (e.g., server computer 12). Further, while the second device has been described hereinabove as a client electronic device, the second device may additionally/alternatively be a server (e.g., server computer 12 and/or another server computer; not shown).

Figure 7:
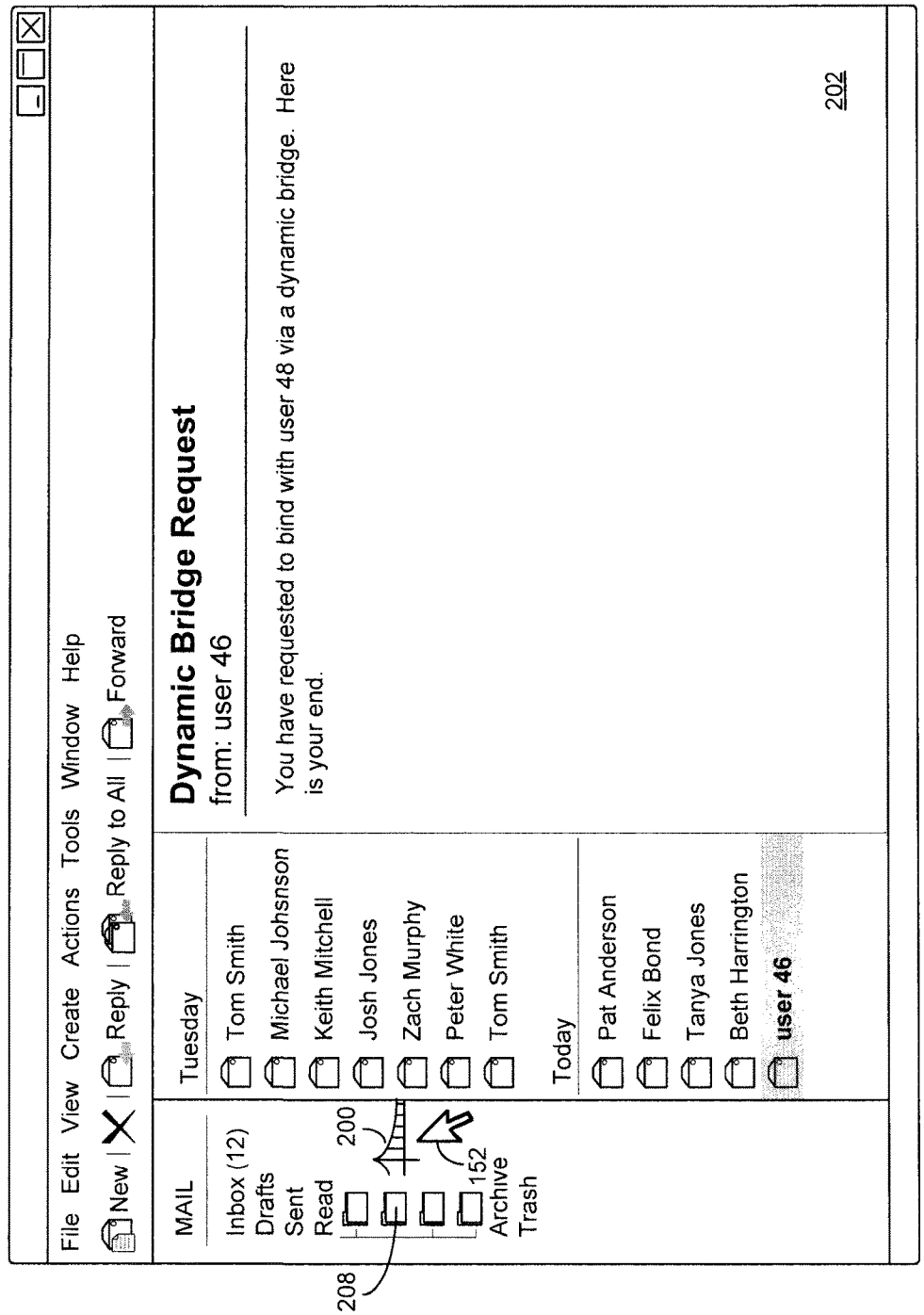
FIG. 7 is a diagrammatic view of a display screen rendered by the email client application and/or the dynamic bridge process of FIG. 1.
Figure 8:
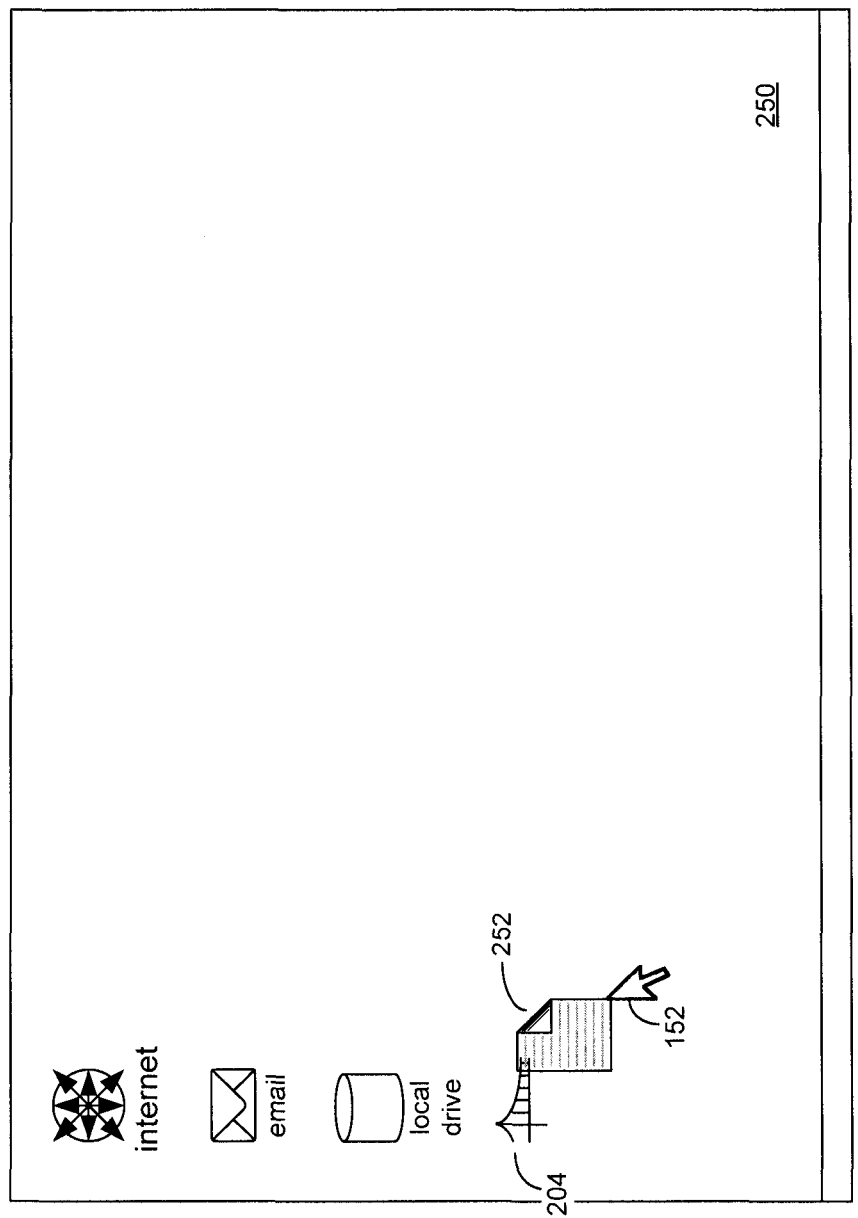
FIG. 8 is a diagrammatic view of a user interface desktop of a client electronic device of FIG. 1.

The first dynamic bridge end and/or the second dynamic bridge end may include a movable end point location, e.g., which may drag-and-dropped, cut-and-pasted, etc. For example, and referring to FIG. 7, user 46 may move the end point location of the first dynamic bridge end by dragging icon 200 from bridge request notice 202 (e.g., by click and holding using onscreen pointer 152). User 46 may then drop the first dynamic bridge end at a desired end point location for the first dynamic bridge end. For example, as shown user 46 may drop icon 200 in folder 208 in the electronic mailbox "Read" associated with email client application 22. Once dropped in folder 208, the first dynamic bridge end may have an end point location of folder 208 within the electronic mailbox "Read" associated with email client application 22. As discussed above, various additional/alternative techniques may be utilized for moving the end point location of the first and second dynamic bridge ends. Referring also to FIG. 8, in a similar manner, user 48 may move the second dynamic bridge end to the desktop in the user interface 250 of notebook computer 40, e.g., as indicated by icon 204.

When the first dynamic bridge end and the second dynamic bridge end are initially generated (e.g., in response to the received request for the first dynamic bridge end and the transmitted capability for the second dynamic bridge end), the location of each bridge end (i.e., in dynamic bridge request notices 202, 206) may be based upon, e.g., system settings. When the endpoint location of the first dynamic bridge end is moved (e.g., to folder 208) location information associated with the first dynamic bridge end may be updated. In a peer-to-peer system, the first dynamic bridge end may transmit its new location information to the second dynamic bridge end. In a central server controlled system, the first dynamic bridge end may transmit its new location information to the a dynamic bridge server (e.g., server computer 12) which may store the location information for the first dynamic bridge end, e.g., in a database or other repository. The location information associated with the second dynamic bridge end may be similarly updated when the end point location of the second dynamic bridge end is moved. Various methods and mechanisms for maintaining current location information regarding each dynamic bridge end may equally be employed.

As mentioned above, the first dynamic bridge end and the second dynamic bridge end may create a path for transmission of an object. Dynamic bridge process 10 may enable an object (e.g., word processing document 252 in the illustrated example) to be transferred between the first dynamic bridge end and the second dynamic bridge end via the path created for transmission of the object (e.g., which may include a communication link). As shown in FIG. 8, user 48 may drag document onto icon 204 using onscreen pointer 152. In response to document 252 being dragged onto icon 204 (which may represent the second dynamic bridge end), dynamic bridge process 10 may transfer document 252 between the first dynamic bridge end and the second dynamic bridge end (i.e., may transfer document 252 from the second dynamic bridge end, represented by icon 204, to the first dynamic bridge end, represented by icon 200). In addition/as an alternative to dragging the object onto the icon, the object may by cut-and-pasted onto the icon representing the dynamic bridge end.

Transferring the object between the first dynamic bridge end and the second dynamic bridge end may include establishing a communication link (e.g., which may be a path for transmission of the object) between the first dynamic bridge end and the second dynamic bridge end. Consistent with the illustrative embodiment, dynamic bridge process 10 may interface with an email system (e.g., with one or more of email server application 20 and email client applications 22, 24, 26, 28). Accordingly, establishing a communication link between the first dynamic bridge end and the second dynamic bridge end may include establishing a communication link via the email system. However, even in an embodiment in which one or more of the first dynamic bridge end and the second dynamic bridge end may have an end point location within an electronic mailbox, dynamic bridge process may utilize a communication link other than an email system (e.g., enterprise service bus, web service call, or the like) for transferring the object. Continuing with the above-stated example, dynamic bridge process 10 may transfer document 252, e.g., embedded in or as an attachment to an email sent from email client application 24 (e.g., which may reside on client electronic device 40). Of course, other mechanisms may be utilized for transferring document 252 via a communication link utilizing the email system.

As discussed above, transferring the object between the first dynamic bridge end and the second dynamic bridge end may include transferring the object directly between the first dynamic bridge end and the second dynamic bridge end (e.g., the path created for transmission of the object may include a direct path between the first dynamic bridge end and the second dynamic bridge end). Additionally/alternatively, dynamic bridge process 10 may transfer the object between the first dynamic bridge end and the second dynamic bridge end including establishing a communication link via a dynamic bridge server (e.g., the path created for transmission of the object may include a path via a dynamic bridge server). For example, transferring the object may include transferring the object from the second dynamic bridge end (in the illustrated example) to the dynamic bridge server (e.g., to a server-side dynamic bridge process 10 residing on server computer 12). Server-side dynamic bridge process 10 may then transfer the object to the first dynamic bridge end. In such an embodiment, it may not be necessary for the first dynamic bridge end and the second dynamic bridge end to maintain location information associated with the other dynamic bridge end. Location information associated with the first dynamic bridge end and the second dynamic bridge end may be maintained by the dynamic bridge server, e.g., which may forward the object from the originating dynamic bridge end to the destination dynamic bridge end.

Transferring the object between the first dynamic bridge end and the second dynamic bridge end may include transcoding the object. Continuing with the above-stated example, when initiating the dynamic bridge, user 46 may have defined a dynamic bridge attribute to format the object according to the destination location. Further, in the illustrated example, user 46 may have moved the location end point of the first dynamic bridge end into an electronic mailbox (e.g., into folder 208). Accordingly, consistent with the attributed defined for the dynamic bridge, objects transferred to the first dynamic bridge end may be formatted as email (e.g., corresponding to the end point location of the first dynamic bridge end being in an electronic mailbox). For example, document 252 transferred to the first dynamic bridge end may be transcoded 110 to provide an email object. As such, the content of document 252 may be formatted as an email and/or document 252 may be provided as an attachment to an email.

Transcoding objects transferred between the first dynamic bridge end and the second dynamic bridge end may utilize adapters that may transcode various source objects into desired output objects. The adapters may be included with the first dynamic bridge end and/or the second dynamic bridge_end. Additionally/alternatively, the adapters may reside on a server (e.g., server computer 12). An object transferred between the first dynamic bridge end and the second dynamic bridge end via a dynamic bridge server may be transcoded by the dynamic bridge server. Additionally/alternatively, transcoding may be carried out utilizing a web services paradigm. For example, when an object is received by (or transmitted from) a dynamic bridge end, a web services call may be made to a dynamic bridge server, e.g., which may provide transcoding services. Various additional/alternative embodiments may similarly be utilized.

Figure 9:
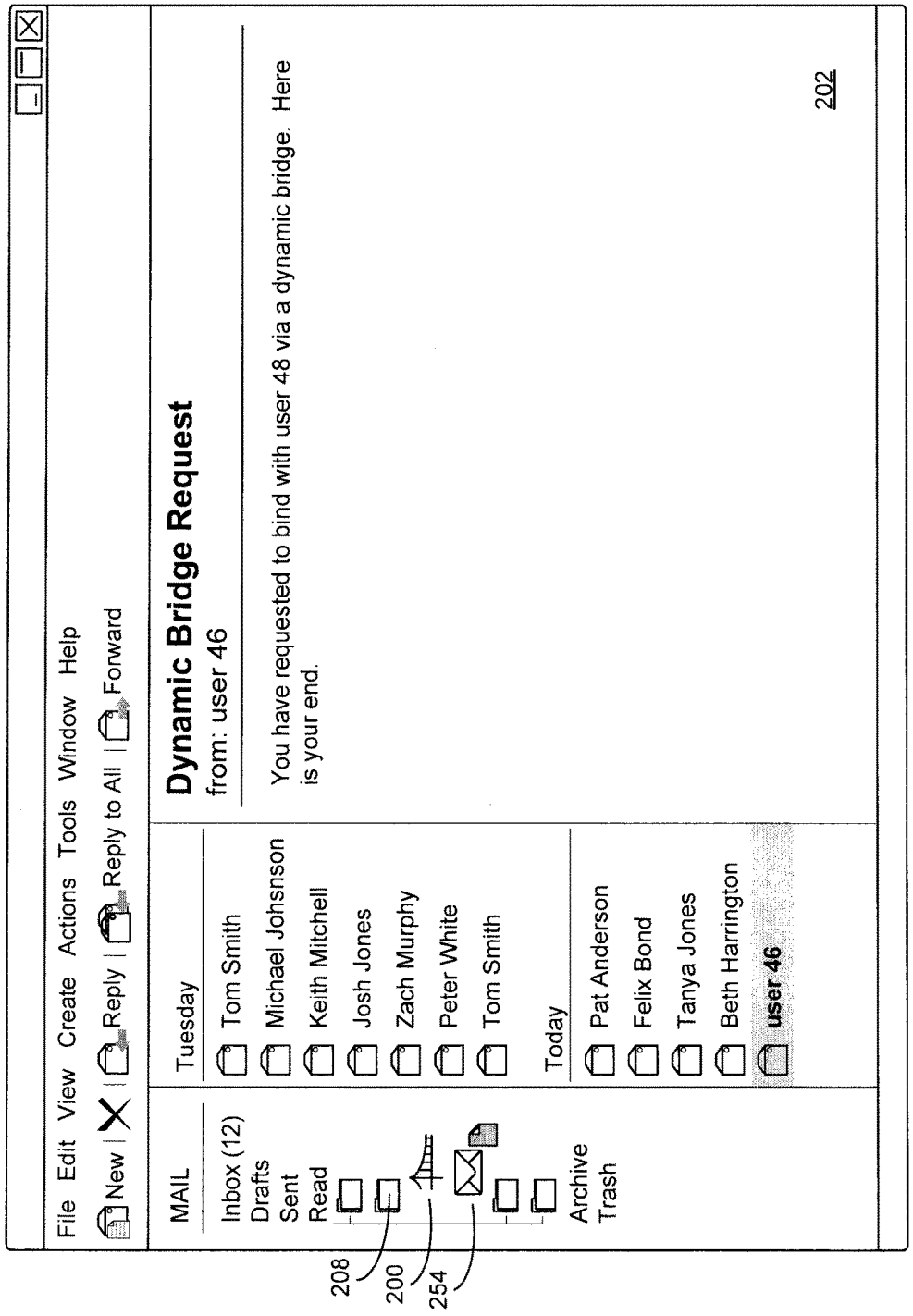
FIG. 9 is a diagrammatic view of a display screen rendered by the email client application and/or the dynamic bridge process of FIG. 1.

Transferring may include depositing the object into a repository. Continuing with the above-stated example, and referring also to FIG. 9, as described above, the first dynamic bridge end may have been moved into folder 208 of an electronic mailbox (e.g., as indicated by icon 200 associated with folder 208). In this example, folder 208 may be the repository. When document 252 is transferred 104 between the first dynamic bridge end and the second dynamic bridge end, dynamic bridge process 10 may deposit document 252 into folder 208 (e.g., as transcoded object 254 in the form of an email). While the repository in the exemplary embodiment is a folder within and electronic mailbox, this should not be construed as a limitation of the present disclosure, as other repositories (e.g., a database, a file system, a teamroom, etc.) may equally be utilized.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   creating a first dynamic bridge end of a dynamic bride at a first device in response to receiving a request for the first dynamic bridge end, the first dynamic bridge end comprising a movable end point location; and
   transmitting a capability for a second dynamic bridge end of the dynamic bridge to a second device, wherein the first dynamic bridge end and the second dynamic bridge end create a path for transmission of an object.

2. The method of claim 1, further comprising receiving a representation of the first dynamic bridge end by the first device in response to creating the first dynamic bridge end.

3. The method of claim 2, wherein the representation of the first dynamic bridge end comprises an icon, the first dynamic bridge end being movable from one end location to another end location by one of dragging-and-dropping the icon, cutting-and-pasting the icon, or replication of the icon.

4. The method of claim 2, further comprising receiving a first dynamic bridge request notice by the first device, the first dynamic bridge end comprising a feature embedded in or attached to the dynamic bridge request notice.

5. The method of claim 1, wherein transmitting the capability for the second dynamic bridge end to the second device comprises transmitting a second dynamic bridge request notice to the second device, the second dynamic bridge end comprising a feature embedded in or attached to the second dynamic bridge request notice.

6. The method of claim 1, further comprising transmitting the object between the first dynamic bridge end and the second dynamic bridge end in response to positioning the object on one of the first dynamic bridge end or the second dynamic bridge end.

7. The method of claim 1, wherein the first dynamic bridge and the second dynamic bridge each comprise one or more adapters for transmitting objects over various communications networks.

8. The method of claim 1, further comprising creating the path for transmission of the object directly between the first dynamic bridge end and the second dynamic bridge end in response to positioning the object on one of the first dynamic bridge end or the second dynamic bridge end.

9. The method of claim 1, further comprising creating the path for transmission of the object between the first dynamic bridge end and the second dynamic bridge end via a dynamic bridge server in response to positioning the object on one of the first dynamic bridge end or the second dynamic bridge end.

10. The method of claim 1, further comprising determining the end point location of the first dynamic bridge end in response to the first dynamic bridge end being moved.

11. The method of claim 1, further comprising reporting a new end point location by the first dynamic bridge end in response to the first dynamic bridge end being moved.

12. The method of claim 11, wherein the new end point location is reported to one of the second dynamic bridge end or a dynamic bridge server, wherein the dynamic bridge server stores the end point location for each of the first dynamic bridge end and the second dynamic bridge end.

13. The method of claim 1, further comprising transcoding the object based on an end point location of the first dynamic bridge end or the second dynamic bridge end where the object is being transferred.

14. The method of claim 1, further comprising presenting a dynamic bridge attribute menu in response to the request for the first dynamic bridge end, wherein presenting the dynamic bridge attribute menu comprises:
   presenting a feature for entering an address for transmitting the capability for the second dynamic bridge end;
   presenting a feature for selecting bi-directional transfer of objects;
   presenting a feature for selecting the dynamic bridge ends to be replicated;
   presenting a feature for selecting to retain a copy of the object being transferred; and
   presenting a feature for selecting to format objects being transferred by the dynamic bridge to be formatted according to a destination location.

15. A system, comprising:
   a processor;
   a module operating on the processor for dynamic bridge object transfer, the module being configured to perform a set of functions comprising:
   creating a first dynamic bridge end of a dynamic bridge at a first device in response to receiving a request for the first dynamic bridge end, the first dynamic bridge end comprising a movable end point location; and
   transmitting a capability for a second dynamic bridge end of the dynamic bridge to a second device, wherein the first dynamic bridge end and the second dynamic bridge end create a path for transmission of an object.

16. The system of claim 15, wherein the set of functions further comprises receiving a representation of the first dynamic bridge end by the first device in response to creating the first dynamic bridge end, wherein the representation of the first dynamic bridge end comprises an icon, the first dynamic bridge end being movable from one end location to another end location by one of dragging-and-dropping the icon, cutting-and-pasting the icon, or replication of the icon.

17. The system of claim 15, wherein the set of functions further comprises creating the path for transmission of the object directly between the first dynamic bridge end and the second dynamic bridge end in response to positioning the object on one of the first dynamic bridge end or the second dynamic bridge end.

18. The system of claim 15, wherein the set of functions further comprises creating the path for transmission of the object between the first dynamic bridge end and the second dynamic bridge end via a dynamic bridge server in response to positioning the object on one of the first dynamic bridge end or the second dynamic bridge end.

19. The system of claim 15, wherein the set of functions further comprises determining the end point location of the first dynamic bridge end in response to the first dynamic bridge end being moved.

20. A computer program product, the computer program product comprising a non-transitory computer readable storage medium having program instructions embodied therewith, the program instructions being executable by a device to cause the device to perform a method comprising:
creating a first dynamic bridge end of a dynamic bridge at a first device in response to receiving a request for the first dynamic bridge end, the first dynamic bridge end comprising a movable end point location; and
transmitting a capability for a second dynamic bridge end of the dynamic bridge to a second device, wherein the first dynamic bridge end and the second dynamic bridge end create a path for transmission of an object.

\* \* \* \* \*